US006983648B2

(12) United States Patent
Grout

(10) Patent No.: US 6,983,648 B2
(45) Date of Patent: Jan. 10, 2006

(54) COMPONENT MANAGEMENT SYSTEM

(75) Inventor: Michael S Grout, Hove (GB)

(73) Assignee: BAE Systems plc, Farnborough (GB)

( * ) Notice: Subject to any disclaimer, the term of this patent is extended or adjusted under 35 U.S.C. 154(b) by 227 days.

(21) Appl. No.: 10/297,255

(22) PCT Filed: Jun. 5, 2001

(86) PCT No.: PCT/GB01/02461

§ 371 (c)(1),
(2), (4) Date: Dec. 4, 2002

(87) PCT Pub. No.: WO01/95174

PCT Pub. Date: Dec. 13, 2001

(65) Prior Publication Data

US 2003/0159493 A1 Aug. 28, 2003

(30) Foreign Application Priority Data

Jun. 8, 2000 (GB) ................................. 00139936

(51) Int. Cl.
*G01L 5/28* (2006.01)

(52) U.S. Cl. ............................................. 73/129; 73/7

(58) Field of Classification Search ...................... 73/7, 73/8, 86, 129, 146
See application file for complete search history.

(56) References Cited

U.S. PATENT DOCUMENTS

| | | | | | |
|---|---|---|---|---|---|
| 2,981,929 | A | * | 4/1961 | Rizzo et al. ................ | 340/454 |
| 3,898,459 | A | | 8/1975 | Lechman et al. | |
| 5,060,156 | A | | 10/1991 | Vajgart et al. | |
| 5,557,552 | A | | 9/1996 | Naito et al. | |
| 5,838,251 | A | * | 11/1998 | Brinkmeyer et al. ....... | 340/5.22 |
| 6,023,967 | A | | 2/2000 | Chung et al. | |
| 6,067,159 | A | * | 5/2000 | Discenzo et al. ........... | 356/450 |

FOREIGN PATENT DOCUMENTS

GB 2 317 035 3/1998

OTHER PUBLICATIONS

Federal Aviation Administration: Internet Article Mar. 1998 "Flight Test Guide for Certification of Transport Category Airplanes".
National Transportation Safety Board: Internet Article Jun. 1999 Aircraft Accident Report—Runaway Overrun During Landing American Airlines Flight 1420, Jan. 1999.

* cited by examiner

*Primary Examiner*—Robert Raevis
(74) *Attorney, Agent, or Firm*—Nixon & Vanderhye P.C.

(57) ABSTRACT

A system in the form of a database allowing operators of aircraft or any other equipment where components are subject to wear to manage all the maintenance, analysis and provisioning aspects of such components e.g. brake and wheel components. The system is able to predict component, e.g. tyre, life to a high degree of accuracy based on the measured wear rate of the component or a related component such as each tyre's related brake unit.

15 Claims, No Drawings

COMPONENT MANAGEMENT SYSTEM

This application is the US national phase of international application PCT/GB01/02461, filed in English on 5 Jun. 2001, which designated the US. PCT/GB01/02461 claims priority to GB Application No. 0013936.0 filed 8 Jun. 2000. The entire contents of these applications are incorporated herein by reference.

This invention relates to a component management system and particularly to such a system for managing components subject to wear e.g. components in or related to a braking system such as an aircraft braking system.

Airline operators, in the management of spare parts, traditionally have to use very general and usually somewhat inaccurate information upon which to calculate spares requirements for the replacement of components. Such systems can lead to either too many or too few of a particular component being held, can lead to components being held in the wrong place at the wrong time and can generally cost the airline operator a lot of unnecessary money.

It is an object of the invention to provide a system for management of components subject to wear which will overcome the difficulties of the prior art According to one aspect of the present invention there is provided a system for management of components subject to wear including measuring wear rate of another component whose wear rate is related to the wear rate of the said component and using the measured wear rate to determine the predicted life of the said component. The said component may comprise an aircraft tyre and the other said component may comprise a brake operable to brake a wheel upon which the tyre is mounted.

The invention can thus provide a system, which is beneficially in the form of a computer database, allowing operators of aircraft or any other equipment where components are subject to wear to manage all the maintenance, analysis and provisioning aspects of such components, such as brake and wheel components, with the unique feature of being able to predict component, e.g. tyre life to a high degree of accuracy based on the measured wear rate of the component or a related component such as each tyre's related brake unit. From the predicted life of the component, spares requirements for that component may be determined, e.g. by determining the number of spares required and/or the location at which they will be required to be kept.

Inspection of the said component for a final determination as to whether replacement is required may thus be limited to a much narrower time band and the determination of when to change the component is therefore made a much easier and more certain step.

A formula, according to the invention, which has been used to predict expected tyre life for a given tyre is as follows:

$$\text{Predicted Tyre Life} = ((A/B)\times(C-D))+D$$

Where

| | | |
|---|---|---|
| A = Fleet average brake wear rate | | (inches/landing) |
| B = Brake wear rate for subject wheel | | (inches/landing) |
| C = Fleet average tyre life | | (landings) |
| D = Minimum tyre life | | (landings) |

The system of the invention may have the following features:

Input of Brake Wear Indicator pin dimensions;

Historical record of maintenance performed on wheels and brakes;

Current status of each wheel and each brake unit fitted to each aircraft;

Automatic forecasting of wheel and brake unit changes;

Wear rate calculations for components, e.g. wheels and brake units, revealing any wear imbalances (for example for wheels on the same axle), Predicted lives of components, e.g. installed wheels or brake units;

Reporting of reliability and maintainability statistics;

Automatic forecasting of component, e.g. wheel and brake unit spares requirements.

Some examples of aircraft component costs are set out below:

| | |
|---|---|
| Brake spacer | £800 |
| Tyre (remould) | £400 |
| Brake set | £12,000 |

A tyre may last about 400 landings, or about 2 months on average, for normal schedules. We have seen from the programme one tyre wearing at twice the normal rate but were able to correct the aircraft fault before the tyre was ruined and were able to get two thirds or more of the life out of the tyre.

Hence for a 10 aircraft fleet, times 6 tyres, times 6 for a years use, gives 360 tyres or £144,000 per year spent on tyres.

A brake set may last on average one year, and with 4 per aircraft for a 10 aircraft fleet, that is 40 brake sets per year or £480,000 per year.

Thus it can be seen that even a five per cent annual saving on these costs will amount to over £25,000.

According to another embodiment of the invention there is provided a method of determining wear imbalance in components by comparing predicted lives for at least two said components operating on a single piece of equipment. For example a malfunctioning component in a brake or anti-skid system may be identifed, according to the invention. Established wear patterns may be used to help make this determination.

Data input into a software programme according to the invention to predict wear life of aircraft tyres may include brake wear pin fitting date; date of commencement of monitoring of the components; number of aircraft landings at the commencement date of monitoring; the date when the brake or wheel was last changed; brake wear indicator pin dimensions.

Other factors which may be introduced into the system of the invention, when related to brakes and tyres, include brake hydraulic pressures; anti-skid control systems features; runway types; weather: temperatures etc.

The system of the invention can learn from updated tyre wear rates in making its component wear predictions.

What is claimed is:

1. A method of managing spares for a fleet having first components, where each of the first components have a wear rate, said method including the steps of:

measuring a wear rate of second components, where the wear rate of said second components is related to the wear rate of the first components;

using the measured wear rate of the second components to determine the predicted life of the first components; and determining the number of spares of the first components based upon the predicted life of the first components.

2. The method according to claim 1 in which the first components comprises aircraft tyres and the second components comprises aircraft brakes operable to brake wheels upon which the tyres are mounted.

3. The method according to claim 2 in which the step of measuring the wear rate of the second components includes taking periodic measurements of the length of a wear pin for the brakes.

4. The method according to claim 1, when applied to managing fleet spares at more than one location, including the step of determining the number of spares to be provided at each location, based upon the locations of equipment utilising the first components.

5. The method according to claim 1, including the step of comparing predicted lives of components to determine any wear rate imbalance therebetween.

6. The method according to claim 5, when applied to an aircraft braking system, in which a wear rate imbalance detected between components is used to identify one of a malfunctioning brake and a wheel anti-skid unit.

7. The method according to claim 1 including the step of providing a historical record of maintenance carried out on components.

8. The method according to claim 2, using data selected from:

brake wear pin fitting date;

date of commencement of component monitoring;

number of aircraft landings at the date of commencement of component monitoring;

date when brake or wheel last changed;

runway type;

weather conditions.

9. The method according to claim 2, in which the predicted life of the tyre (PTL) is determined according to the relationship:

$$PTL=((A/B)\times(C-D))+D$$

where

A =Fleet average brake wear rate, measured in inches/landing;

B =Brake wear rate for subject wheel, measured in inches/landing;

C =Fleet average tyre life, measured in numbers of landings;

D =Minimum tyre life, measured in numbers of landings.

10. The method according to claim 1 including the step of storing the results of said measuring step in a computer database.

11. A method of managing spares for a fleet of first components, where each of the first components has a wear rate, said fleet including second components where each of the second components has a wear rate which is related to the wear rate of the first components, said method including the steps of:

measuring the wear rate of second components;

predicting the predicted life of the first components using the measured wear rate of the second components; and determining a required number of spares of said first components based upon the predicted life of said first components.

12. A method of managing spares according to claim 11, wherein said first components comprise tires and said second components comprise brakes.

13. A method of managing spares according to claim 12, wherein said tires and said brakes are aircraft tires and aircraft brakes.

14. A method of managing spares according to claim 13, wherein said measuring step comprises the measuring of a wear pin associated with each of said aircraft brakes.

15. A method of managing spares according to claim 11, wherein said method further includes the step of comparing the predicted life of each of said first components and indicating any imbalance of wear rate among said first components.

* * * * *